(12) United States Patent
Dent

(10) Patent No.: US 6,408,018 B1
(45) Date of Patent: Jun. 18, 2002

(54) COMPLEX MATCHED FILTER WITH REDUCED POWER CONSUMPTION

(75) Inventor: Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/286,503

(22) Filed: Apr. 6, 1999

Related U.S. Application Data

(63) Continuation-in-part of application No. 08/748,755, filed on Nov. 14, 1996, now Pat. No. 6,005,887.

(51) Int. Cl.[7] .......................... H04B 15/00; H04K 1/00; H04L 27/30
(52) U.S. Cl. .................. 375/150; 375/142; 708/422
(58) Field of Search .............................. 375/152, 142, 375/143, 150, 151, 153; 708/422, 423, 424, 426, 425

(56) References Cited

U.S. PATENT DOCUMENTS

| | | | | |
|---|---|---|---|---|
| 5,365,549 A | * | 11/1994 | Kazecki | 375/343 |
| 5,999,562 A | * | 12/1999 | Hennedy et al. | 375/207 |
| 6,005,887 A | * | 12/1999 | Bottomley et al. | 375/207 |
| 6,130,906 A | * | 10/2000 | Davidovici et al. | 375/152 |

FOREIGN PATENT DOCUMENTS

| | | |
|---|---|---|
| WO | 00/08985 | 7/2000 |

OTHER PUBLICATIONS

Norm Couturier, James Wight and Leroy Pearce, "Experimental Results for Four–Pase Digital Matched Filtering of Spread–Spectrum Waveforms", *IEEE Transactions on Communications*, vol. COM–34, No. 8, Aug. 1986, XP002108864, pp. 836–840.

Rolf Nauerz and Herbert Bauer, "The Suitability of Modern CMOS Gate Array Circuits as Correlators and Matched Filters for Spread–Spectrum Signals", Proceedings of the Military Communications Conference, (MILCOM), US, New York, IEEE, vol. CONF. 6, 1987, XP000124771, pp. 473–478.

* cited by examiner

*Primary Examiner*—Chi Pham
*Assistant Examiner*—Phuong Phu
(74) *Attorney, Agent, or Firm*—Coats & Bennett, P.L.L.C.

(57) ABSTRACT

A matched filter computes complex correlations between a sequence of complex input values and a complex code. The matched filter includes a set of N changeover switches having a first input connected to receive real parts of the input sample values and a second input connected to receive imaginary parts of the input sample values. The switches further include a control input for receiving a control signal in first and second states. When the control signal in the first state is applied, a first output of the changeover switch contains the real value part of the input sample values and a second input contains the imaginary part of the input sample values. When the control signal is in the second state the first input contains the imaginary value part of the input sample values and the second input contains the real value part of the input sample values.

16 Claims, 4 Drawing Sheets

COMPLEX MATCHED FILTER WITH REDUCED POWER CONSUMPTION

RELATED APPLICATION

This Application is a continuation-in-part of U.S. application Ser. No. 08/748,755 filed on Nov. 14, 1996 U.S. Pat. No. 6,005,887 issued on Dec. 21, 1999.

BACKGROUND OF THE INVENTION

1. Technical Field of the Invention

The present invention relates generally to radio receivers for receiving and despreading direct sequence spread spectrum signals, also known as Code Division Multiple Access (CDMA) signals, and more particularly, to a complex matched filter for use in a receiver which reduces power consumption by using CDMA waveforms using complex despreading codes.

2. Description of Related Art

FIG. 1 illustrates a prior art matched filter type of correlator for correlating real values. A received signal is sampled at a rate Fc samples per second and the samples are entered sequentially to the input of a number of multipliers 10. Each multiplier 10 includes a second input for receiving a code value C1. The present example illustrates a matched filter having a length of 64. A current input sample Si is multiplied by the code value C1 in the left most multiplier 10a, and the output C1.Si is input to a one sample delay element D1. The value C1.Si emerges from the delay element D1 during the next sample period when the input sample value S(i+1) is input to the inputs of each of the multipliers 10. As the value C1.Si emerges from the delay element 01 and is applied to the input of a first summer 15a, the multiplier 10b multiplies input sample S(i+1) by the input code C2 to obtain a value C2.S(i+1). This is applied to the second input of the first summer 15a. The output from the summer 15a of (C1.Si+C2.S(i+1)) is input into a second delay element D2. This value emerges from the delay element D2 during the next sample period when S(i+2) is input to the multipliers 10. The output from D2 is added to the value C3.S(i+2) at summer 15b, and the output of summer 15b is applied to a first input of delay element D4. This process continues in a similar manner until 64 samples have been input to the filter, a value emerges from the rightmost summer 15 and is equal to:

$$C1.S(i)+C2.S(i+1)+C3.S(i+2) \ldots +C64.S(i+63)$$

This equation comprises a 64 sample correlation between the code values C1 . . . C64 and the signal samples S(i) . . . S(i+63). After the first 64 samples have been entered, each successive signal sample creates a new 64 point correlation computed in the following manner:

$$S(i+1) \ldots S(i+64)$$

$$S(i+2) \ldots S(i+65) \ldots \text{and so forth.}$$

The resulting correlations are a combination of the code symbols C1 . . . C64 with 64 signal samples selected according to a sliding window 64 samples wide. Thus this type of matched filter may also be called a sliding correlator.

The matched filter of FIG. 1 is required to perform 64 multiplications and 63 additions during each sample period of the clock. A complex correlator may employ four of the matched filters of FIG. 1 to compute the inner products in the equation:

$$Cr.Sr,\ Ci.Si,\ Cr.Si,\ Ci \ldots Sr$$

where Cr is an N-element vector of the real code symbols, Sr is a vector comprising the real parts of the last N input samples, Ci is an N-element vector of imaginary code symbols and Si is a vector comprising imaginary part of the last N input samples.

The complex correlation of these vectors is given by:

Cr.Sr+Ci.Si; for the real part of the desired correlation;

Cr.Si−Ci.Sr; for the imaginary part of the desired correlation. It is implicitly assumed that the desired correlation is between any N input samples Sr and the complex conjugate of the N sample code (Cr, Ci), thus giving rise to the exemplary choice of plus and minus signs in the above example.

Prior art filters for producing complex correlation values use four of the above described matched filter, thus requiring, 4N multiplication processes, 4(N−1) addition processes and 4(N−1) delay elements in order to achieve the complex correlation value. If some method could be found to reduce the number of multiplication, addition and delays performed to obtain each successive correlation value, a dramatic reduction in the power consumed by the equipment forming the complex correlations would be realized. In applications such as cellular telephones where battery life considerations are paramount such a solution would be of great benefit.

SUMMARY OF THE INVENTION

The present invention overcomes the foregoing and other problems with a matched filter for computing complex correlations between a sequence of complex input samples and a complex code which utilizes less additions and multiplications than those utilized in currently existing complex matched filter. The matched filter includes a set of N changeover switches. The switches each have a first input connected to the real value portion of the input sample values and a second input connected to the imaginary values portion of the input sample values. A control input receives control signals controlling a pair of outputs from the changeover switches. In response to application of a control signal in a first state, the real values are output over a first output of the changeover switches and the imaginary values are output on the second output of the changeover switch. When the control signal moves to a second state the situation is reversed such that imaginary values are output on the first output and real values are output on the second output.

The first outputs of the set of N changeovers are connected with a matched filter portion for generating a real portion of a complex correlation. A first set of N multipliers are connected to the first outputs of the changeover switches. A second input of the N multipliers are connected to receive real symbols of a complex code. The multiplied outputs are applied to the first set of (N−1) adders which add the multiplied outputs of the N multipliers with a corresponding delayed sum to generate an undelayed sum. A set of (N−1) delay elements delay the undelayed sums to produce delayed sums. The first of the undelayed sums comprises an output of the first multiplier rather than an output of an adder. The output of a last adder comprises the real portion of the complex correlation. A second matched filter portion is coupled to the second output of the N changeover switches and is configured in a similar manner as the first matched filter portion. The second matched filter generates the imaginary portion of the complex correlation from the last adder.

BRIEF DESCRIPTION OF THE DRAWINGS

For a more complete understanding of the present invention, reference is made to the following Detailed Description taken in conjunction with the accompanying drawings wherein.

DETAILED DESCRIPTION OF THE INVENTION

Figure 1:
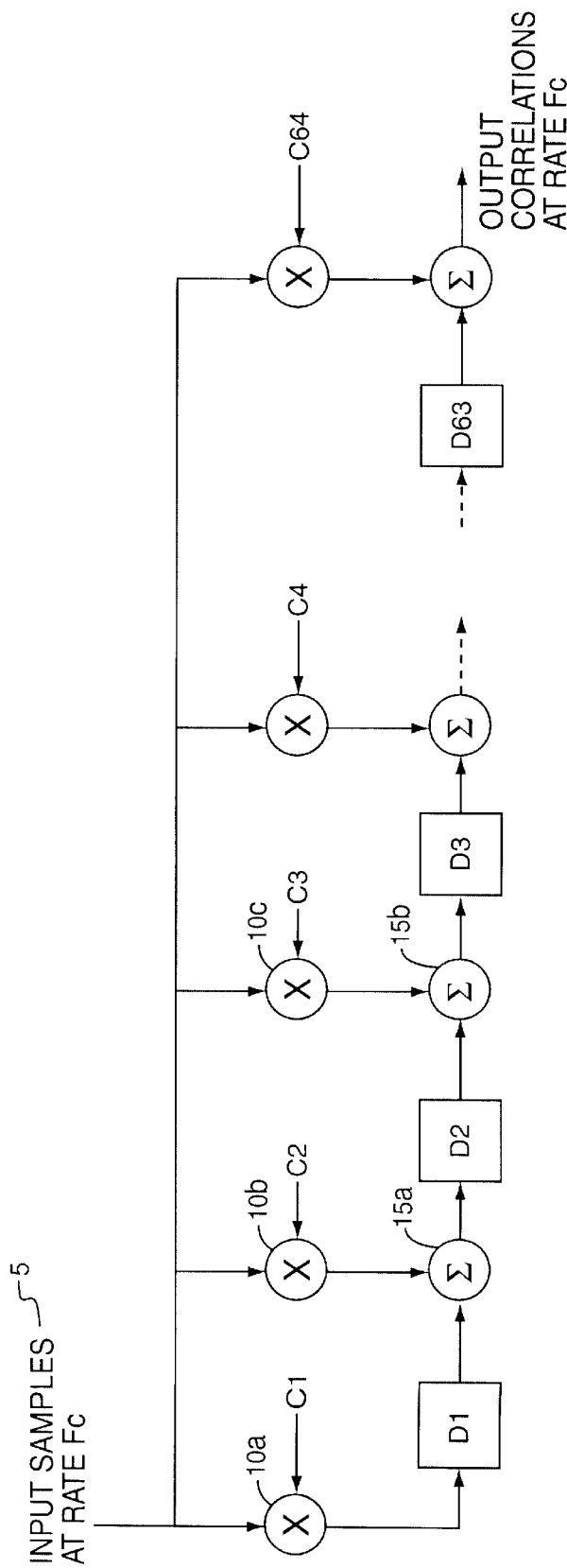
FIG. 1 is an illustration of a prior art sliding correlator.
Figure 2:
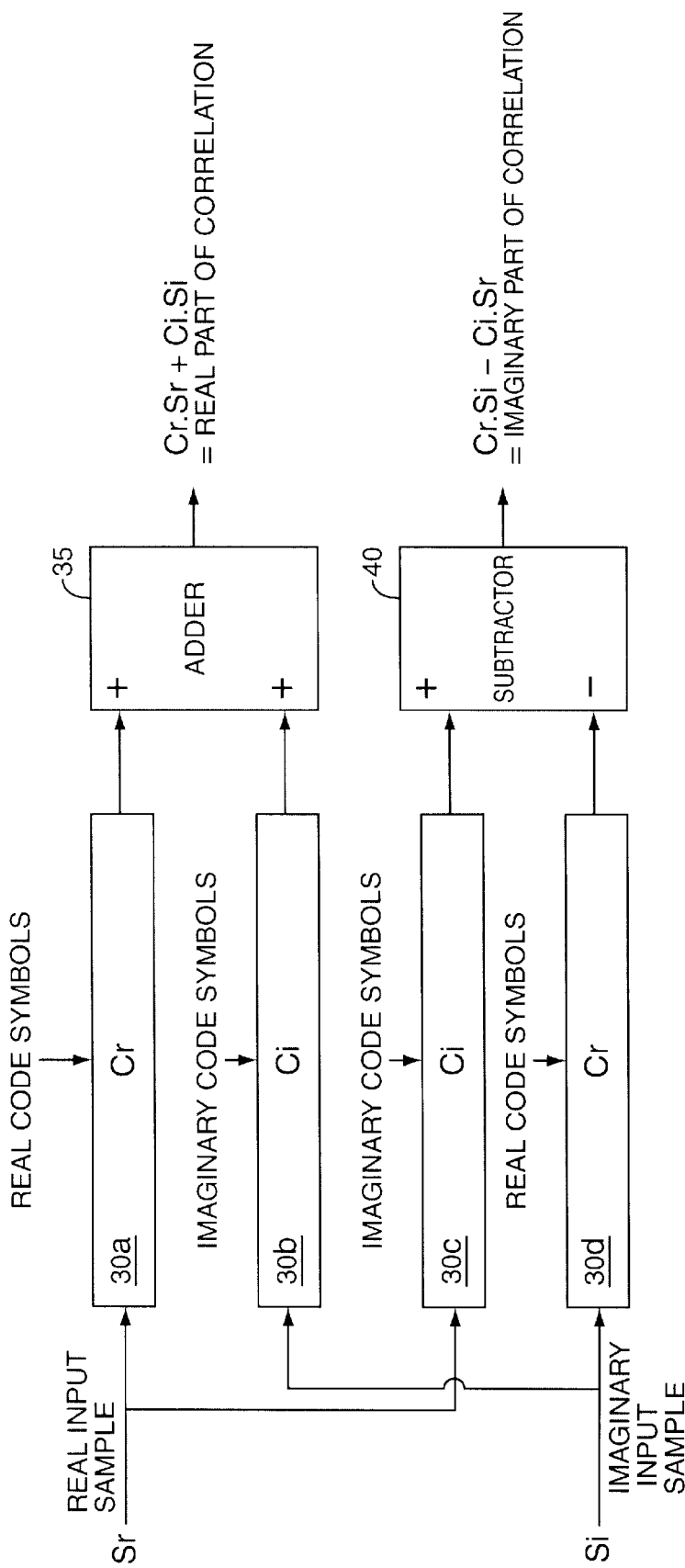
FIG. 2 is an illustration of a complex sliding correlator employing four of the prior art correlators illustrated in FIG. 1.

Referring now to the drawings, and more particularly to FIG. 2, there is illustrated a complex matched filter 30 comprising four of the prior art matched filters 30 illustrated in FIG. 1. Matched filter 30a computes the inner product of Cr.Sr at each sample clock cycle, where Cr is an N-element vector of real code symbol values and Sr is an N-element vector comprising the real part of the last N input samples. Matched filter 30b computes Ci.Si, where Ci is an N-element vector of imaginary code symbol values and Si is a vector of the imaginary parts of the last N input samples. Adder 35 combines the outputs of matched filter 30a (Cr.Sr) and the output of matched filter 30b (Ci.Si) to form a real part of the desired complex correlation at each sample cycle.

Similarly, matched filters 30c and 30d compute Ci.Sr and Cr.Si, respectively, and the output of the matched filters 30c and 5d are combined in subtractor 40 to form the imaginary portion of a desired complex correlation at each sample cycle. U.S. patent application Ser. No. 08/748,755 filed on Jan. 14, 1996, and entitled "Despreading of Direct Sequence Spread Spectrum Communication Signals" which disclosure is incorporated herein by reference, discloses how to perform a complex correlation between sample (Sr+jSi) and a code (Cr+jCi) using only two real correlations, by first rotating the code through 45 degrees. The rotation of (Cr+jCi) through 45 degrees is equivalent to multiplying the sample vector by (1+j), apart from a scaling of the $\sqrt{2}$ where j in the above equals the square root of −1. This provides:

$$(Cr+jCi)(1+j)=(Cr-Ci)+j(Cr+Ci)$$

When this rotated code is correlated with Sr+jSi (i.e., Sr+jSi is multiplied by the complex conjugate of the code), we obtain:

(Cr−Ci).Sr+(Cr+Ci).Si as the real result of the complex correlation; and (Cr−Ci).Si−(Cr+Ci).Sr as the imaginary result of the complex correlation.

If the code symbols Cr and Ci are binary bits which, in arithmetic notation have the value either +1 or −1, either Cr and Ci have the same sign, i.e., both +1 or both −1, in which case the Cr−Ci terms above are zero, or Cr and Ci have opposite signs in which case the (Cr+Ci) terms are zero. Thus, only two of the above four terms can be non-zero after application of the 45 degree rotation step.

It will be appreciated by persons of ordinary skill in the art that correlating a signal Sr+jSi which is received through a radio channel that introduces an arbitrary phase shift is essentially unaffected by correlating the signal with the rotated code. Correlation with the rotated code merely gives a correlation result which is also rotated. This is equivalent to the radio signal having been propagated through one eighth of a wavelength greater distance, which in typical cellular telephone systems is on the order of an inch. This is of no significance to the radio receiver. If for some reason this distance was of significance, the correlation results could be derotated to 45 degrees by adding and subtracting the real and imaginary results. The resulting correlation of this operation is exactly a factor of two higher than it would have been with the prior art correlator illustrated in FIG. 2. This factor could be eliminated by dividing the non zero one of the Cr+Ci or Cr−Ci by two to obtain values of +/−1 instead of +/−2.

In the above equations, if a specific one of Cr is equal to the corresponding Ci, the value 0.5(Cr+Ci).Si=Cr.Si or Ci.Si is added to the accumulated real result, and the 0.5(Cr+Ci).Sr=Cr.Sr or Ci.Sr is subtracted from the accumulated imaginary result. Conversely, if a specific one of Cr and the corresponding Ci have opposite signs, then 0.5(Cr−Ci).Sr=Cr.Sr or −Ci.Sr is additively accumulated to the real results and 0.5(Cr−Ci).Si=Cr.Si or −Ci.Si is additively accumulated to the imaginary result. These results may be regularized by eliminating the need to subtract in one case by reformulating it as follows:

If Cr=Ci, then add Cr.Si to the real result and add −Ci.Sr to the imaginary result;

If Cr=−Ci, then add Cr.Sr to the real result and add −Ci.Si to the imaginary result.

The only difference between the two cases is that Sr and Si are interchanged in the second case compared to the first case. This may be accomplished according to the present invention by using a swapping switch (which will be more fully discussed in a moment) controlled in response to whether Cr=Ci or −Ci. An implementation of this is more fully described in FIG. 3.

A complex input sample stream consisting of a real portion Sr and an imaginary portion Si is applied to a pair of inputs of the matched filter 50. The real portion of the sample stream Sr is fed to a first input of each of N changeover switches 55. The imaginary portion of the input sample stream Si is fed to a second switch input of each of the changeover switches 55. The changeover switches are controlled by code values C1, C2, C3 . . . CN which are respectively given by:

C1=Cr(1)*Ci(1)

C2=Cr(2)*Ci(2)

.
.
.

CN=Cr(N)*Ci(N)

The operator "*" means exclusive-OR if the values are regarded as having the Boolean values "1" or "0". Alternatively, the operator "*" means to multiply if the values are regarded as having the values +1 (equivalent to Boolean "0" or −1 (equivalent to Boolean "1"). The values C1, C2 . . . CN may be preformed codes and do not change during the correlation with a fixed code Cr, Ci.

The changeover switches 55 are arranged to route the real input sample value Sr to the upper matched filter 60 if the control value is Boolean "1" and the imaginary input sample value Si to the lower matched filter 65. If the control value is Boolean "0", the real sample value is routed to the lower matched filter 65 and the imaginary value is routed to the upper matched filter 60.

The values routed to the upper matched filter 60 are multiplied in multipliers 70 by respective real code values Cr(1), Cr(2) . . . Cr(N), while values routed to the lower matched filter 65 are multiplied in multipliers 75 with respective imaginary code values −Ci(1), −Ci(2) . . . −C1(N), which have been negated or complemented by the 45 degree rotation as described above. It is not necessary to complement or negate each of these values as it is equivalent if the imaginary complex correlation result from the lower matched filter 65 is negated. The sign changes are unimportant as long as they are known and can be "fixed" in subsequent processing.

The upper matched filter 60 and lower matched filter 65 multiplier outputs 70, 75 are accumulated in delay-and-add chains 80 and 85, respectively. The delay-and-add chain 80 comprises a first delay circuit 90 having an input connected to the output of multiplier 70a. The output of the delay circuit 90a is connected to an adder 95a. The adder 95a has a second input connected to the output of multiplier 70b. The adder 95a adds together the output from delay circuit 90a and the output of multiplier 70b. The output of adder 95a is applied to a next delay circuit and adder in a similar fashion.

The delay-and-add chain 85 is configured in a similar manner, where the first delay circuit 95a has its input connected to the output of multiplier 75a. An adder 105a has two inputs connected to the output of delay circuit 95 and to the output of multiplier 75b. The output of adder 105 is applied to the next delay circuit 95b, and the process is repeated through the chain in a similar manner.

Multiplier outputs are accumulated in the delay-and-add chains 80 for the upper matched filter 60 and in the delay chain of 85 for the lower matched filter 65. The outputs from the last adders 100N and 105N form the desired real and imaginary portions, respectively, of the complex correlation signal apart from the scaling by $1/\sqrt{2}$ and a 45 degree angle shift. The scaling and angle shift can be "fixed" by using a Butterfly circuit 68 to form the sum and difference of the real and imaginary results.

When values Cr and Ci are binary bits, the multipliers 70, 75 are reduced to sign changers. Sign changing may also be approximated by complementing the values, or, if sign-magnitude representation is used for Sr,Si, may be exactly performed by complementing. The delay elements 90 and 95 may be registers which are loaded with the value presented at their inputs synchronously upon occurrence of each new input sample clock pulse. The loaded value then appears on the outputs after occurrence of the next clock pulse. Adders 100 and 105 may be parallel adders that operate with multi-bit input values presented simultaneously. The wordlength of the multi-bit values increases for each subsequent adder as the possible value for the accumulated result increases from left to right.

For example, if the input values Sr,Si are 4-bit values of up to +/−7, the output of adders 100a and 105b may be up to +/−14, which requires 5 bits to represent. The value from adders 100b and 105b may be up to +/−21 which requires 6 bits to represent. This process continues as illustrated in the table below. For input values of length 4 bits ranging symmetrically positive and negative from +7 to −7, the word length after each adder is as indicated below in Table 1:

TABLE 1

| output of adder 1: | 5 bits | maximum values | +14 to −14 |
| adder 2: | 6 bits | maximum values | +21 to −21 |
| adder 3: | 6 bits | maximum values | +28 to −28 |
| adder 4: | 7 bits | maximum values | +35 to −35 |
| adder 5: | 7 bits | maximum values | +42 to −42 |
| adder 6: | 7 bits | maximum values | +49 to −49 |
| adder 7: | 7 bits | maximum values | +56 to −56 |
| adder 8: | 7 bits | maximum values | +63 to −63 |

For a length N=64 correlator, the maximum values from the 64th adder would be +/−448. This requires a 10-bit representation. The bit-width of the delay elements thus must be adapted to the above word lengths.

If serial arithmetic is used, values to be added are presented to an adder one bit at a time. The least significant bit is presented first. To build a 64-stage correlator for 4-bit input values, ten-bit serial words would be appropriate. This requires a serial bit-clock at a frequency of at least ten times the sample clock rate. This is reasonable up to an input sample rate of a few megahertz. The delay elements would be required to be ten-bit serial shift-registers, or alternatively, a reduced power configuration in which bits are recorded in sequential positions of a ten-bit memory after removing the bit written into the same location ten clock cycles earlier. This technique is referred to as "moving pointers" rather than "moving data" and leads to fewer logic nodes changing state per second, and thus lowers power consumption.

Figure 3:
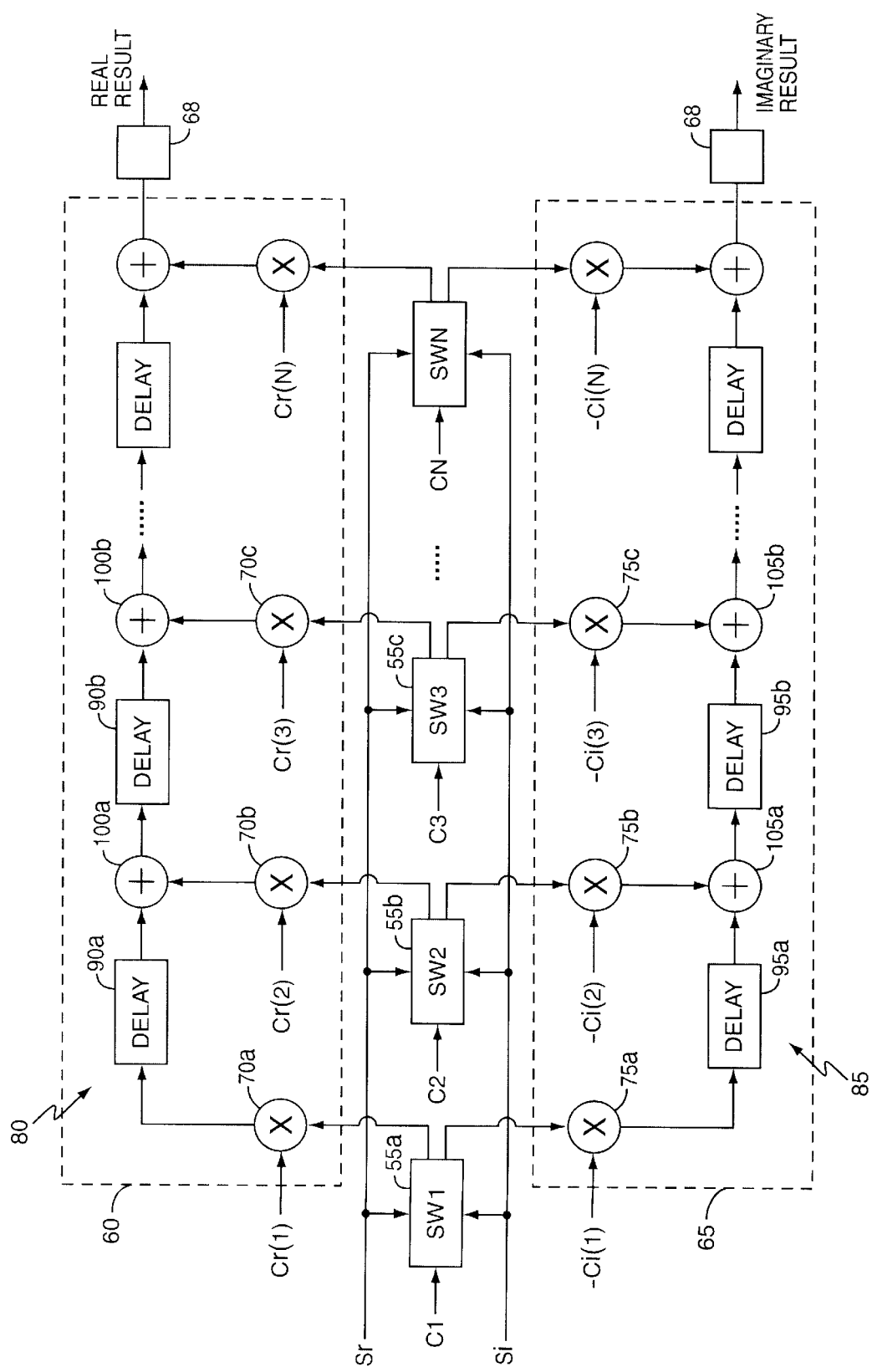
FIG. 3 is a matched filter according to the present invention.
Figure 4:
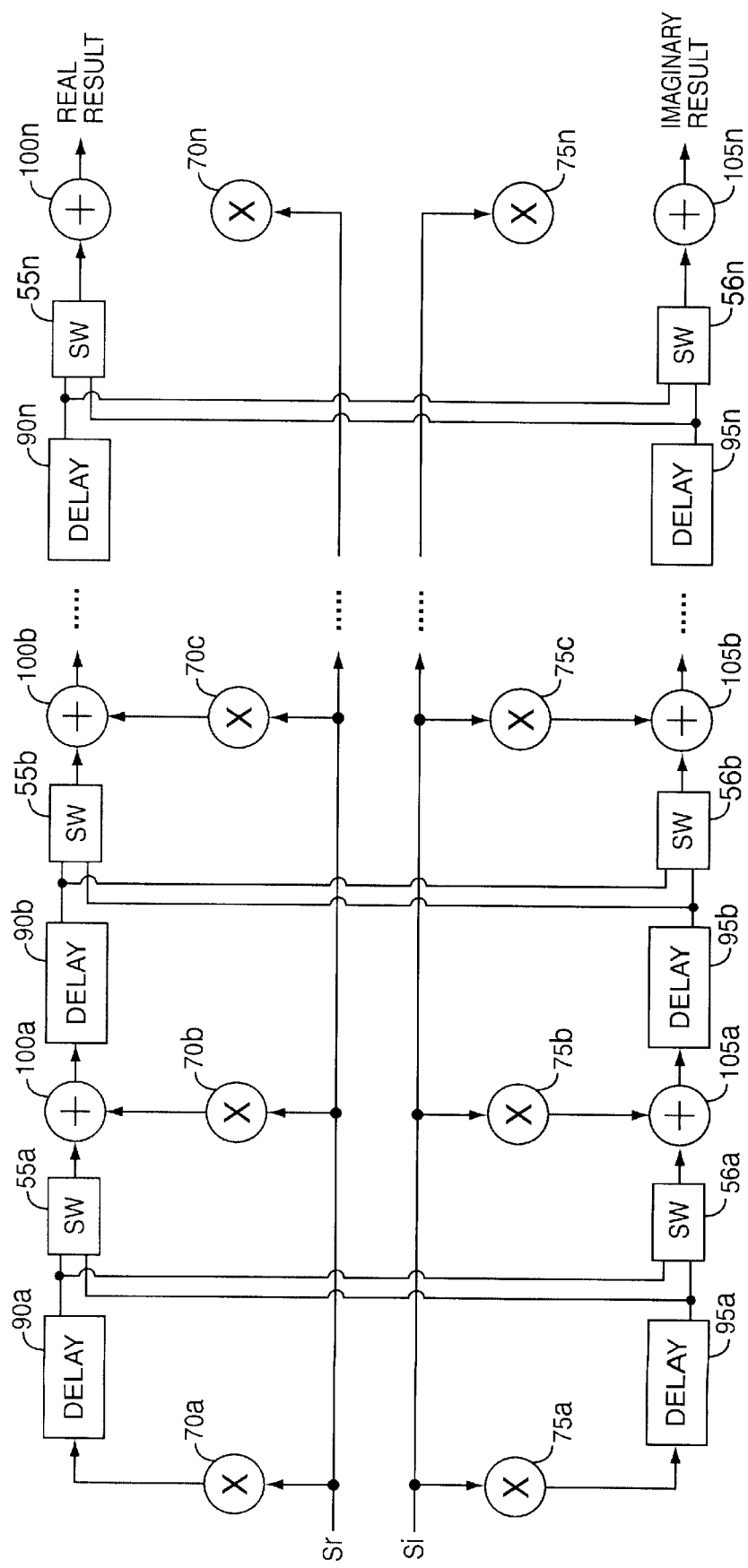
FIG. 4 is an alternative embodiment of a matched filter according to the present invention.

An alternative embodiment of the invention is illustrated in FIG. 4 wherein changeover switches 55, 56 are used to swap the outputs of delay circuits 90 and 95 before they are applied to the adders 100 and 105, respectively. Such a configuration has a disadvantage in that for parallel arithmetic operation, the number of bits that have to be switched increases from left to right. Instead of remaining equal to the wordlength of input values Sr,Si. Thus, FIG. 3 represents a preferred implementation for a sequential matched filter that does not compute precombinations of input values.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A matched filter for computing a complex correlation between a sequence of complex input sample values and a complex code, comprising:

a set of N changeover switches, each switch including a first input connected to receive a real value part of the input sample values, a second input connected to receive an imaginary value part of the input sample values and a control input connected to receive a control signal, wherein application of the control signal in a first state switches the real value part of the input sample values to a first output and switches the imaginary value part of the input sample values to a second output and application of the control signal in a second state switches output of the real value part of the input sample values to the second output and switches output of the imaginary value part of the input sample values to the first output;

a first matched filter portion coupled to each of the first outputs of the N changeover switches for generating a real portion of the complex correlation; and a second matched filter portion coupled to each of the second outputs of the N changeover switches for generating an imaginary portion of the complex correlation.

2. The matched filter of claim 1, wherein the first matched filter portion comprises:

a first set of N multipliers each having a first input connected to one of the first outputs of the N changeover switches and a second input connected to receive real symbols of the complex code for providing a multiplied output;

a first set of (N−1) adders for adding the multiplied output of a respective one of said first N multipliers with a corresponding delayed sum to provide an undelayed sum, wherein an output of a last of the (N−1) adders is the real portion of the complex correlation; and a first set of (N−1) delay elements for delaying the undelayed sums to produce the delayed sums, wherein one of said undelayed sums is an output of a first of said first set of N multipliers.

3. The matched filter of claim 1, wherein the second matched filter portion comprises:

a second set of N multipliers each having a first input connected to one of the first outputs of the N changeover switches and a second input connected to receive imaginary symbols of the complex code for providing a multiplied output;

a second set of (N−1) adders for adding the multiplied output of a respective one of said first N multipliers with a corresponding delayed sum to provide an undelayed sum, wherein an output of a last of the (N−1) adders is the imaginary portion of the complex correlation; and a second set of (N−1) delay elements for delaying the undelayed sums to produce the delayed sums, wherein one of said undelayed sums is an output of a first of said second set of N multipliers.

4. The matched filter of claim 1, wherein the control signal comprises a combination of a respective real symbol with a corresponding imaginary symbol.

5. The matched filter of claim 1, wherein the real and imaginary parts of the complex input sample values are each L-bit binary values.

6. The matched filter of claim 5, wherein the first and second switch inputs comprise L-bit inputs.

7. A matched filter for computing a complex correlation between a sequence of complex input sample values and a complex code, comprising:

a set of N changeover switches, each switch including a first input connected to receive a real value part of the input sample values, a second input connected to receive an imaginary value part of the input sample values and a control input connected to receive a control signal, wherein application of the control signal in a first state switches the real value part of the input sample values to a first output and switches the imaginary value part of the input sample values to a second output and application of the control signal in a second state switches output of the real value part of the input sample values to the second output and switching output of the imaginary values part of the input sample values to the first output;

a first set of N multipliers each having a first input connected to one of the first outputs of the N changeover switches and a second input connected to receive real symbols of the complex code for providing a multiplied output;

a first set of (N−1) adders for adding the multiplied output of a respective one of said first N multipliers with a corresponding delayed sum to provide an undelayed sum, wherein an output of a last of the (N−1) adders is the real portion of the complex correlation;

a first set of (N−1) delay elements for delaying the undelayed sums to produce the delayed sums, wherein one of said undelayed sums is an output of a first of said first set of N multipliers;

a second set of N multipliers each having a first input connected to one of the first outputs of the N changeover switches and a second input connected to receive imaginary symbols of the complex code for providing a multiplied output;

a second set of (N−1) adders for adding the multiplied output of a respective one of said first N multipliers with a corresponding delayed sum to provide an undelayed sum, wherein an output of a last of the (N−1) adders is the real portion of the complex correlation; and a second set of (N−1) delay elements for delaying the undelayed sums to produce the delayed sums, wherein one of said undelayed sums is an output of a first of said second set of N multipliers.

8. The matched filter of claim 7, wherein the control signal comprises a combination of a respective real symbol with a corresponding imaginary symbol.

9. The matched filter of claim 7, wherein the real and imaginary parts of the complex input sample values are each L-bit binary values.

10. The matched filter of claim 7, wherein the first and second switch inputs comprise L-bit inputs.

11. The matched filter of claim 7, wherein the first and second sets of (N−1) delay elements comprise registers which review an input on a first clock cycle and output the input on the next clock cycle.

12. The matched filters of claim 7, wherein the first and second sets of adders comprise parallel adders.

13. An improved method for correlating complex signal values with a complex code, comprising the step of:

generating switch control values by combining the real and imaginary parts of symbols of the complex code;

selecting either a real part of an imaginary part of a complex signal value using a switch responsive to the switch control values;

combining the selected real or imaginary part with a previously combined to produce a new combined result.

14. A method of computing complex correlations including a real result and an imaginary result between the complex sample values and a complex code, said method comprising:

inputting real value parts of successive complex sample values to a first matched filter used to compute a real correlation result if a real part and an imaginary part of corresponding symbols of a complex code are the same;

inputting real value parts of successive complex sample values to a second matched filter used to compute an imaginary correlation result if the real part and the imaginary part of corresponding symbols of the complex code are different;

inputting imaginary value parts of successive complex sample values to the second matched filter if the real part and the imaginary part of corresponding symbols of the complex code are the same;

inputting imaginary value parts of successive complex sample values to the first matched filter if the real part and the imaginary part of corresponding symbols of the complex code are different; and combining the real value parts and the imaginary value parts of the complex sample value input to the first matched filter to produce a real correlation result; and combining the real value parts and the imaginary value parts of the complex sample value input to the second matched filter to produce an imaginary correlation result.

15. The method of claim 14 further comprising combining the real correlation result and the imaginary correlation result.

16. The method of claim 15 wherein combining the real correlation result and the imaginary correlation result comprises computing the sum and the difference of the real and imaginary correlation results.

* * * * *